(12) United States Patent
Miyamoto

(10) Patent No.: US 12,484,565 B2
(45) Date of Patent: Dec. 2, 2025

(54) FISHING REEL AND BATTERY BOX

(71) Applicant: GLOBERIDE, INC., Higashikurume (JP)

(72) Inventor: Issei Miyamoto, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 148 days.

(21) Appl. No.: 18/386,808

(22) Filed: Nov. 3, 2023

(65) Prior Publication Data
US 2024/0172732 A1    May 30, 2024

(30) Foreign Application Priority Data
Nov. 30, 2022    (JP) .................................. 2022-191401

(51) Int. Cl.
| | | |
|---|---|---|
| *A01K 89/01* | (2006.01) | |
| *A01K 89/00* | (2006.01) | |
| *A01K 89/033* | (2006.01) | |

(52) U.S. Cl.
CPC ............ *A01K 89/05* (2015.05); *A01K 89/006* (2013.01)

(58) Field of Classification Search
CPC .............. A01K 89/015; A01K 89/0178; A01K 89/0189; A01K 89/01901; A01K 89/0191; A01K 89/0192
See application file for complete search history.

(56) References Cited

U.S. PATENT DOCUMENTS 6,053,443 A  *  4/2000  Nanbu ...................... G09F 9/00
                                                    242/223
11,395,480 B2 *  7/2022  Yasuda ............. A01K 89/0155

FOREIGN PATENT DOCUMENTS

| JP | 2007-195433 | A | | 8/2007 | |
| JP | 2014-000030 | A | | 1/2014 | |
| JP | 2020-103043 | A | | 7/2020 | |
| KR | 20230031142 | A | * | 3/2023 | ......... A01K 89/0178 |
| KR | 102812743 | B1 | * | 5/2025 | ............. A01K 89/05 |

OTHER PUBLICATIONS

Aug. 7, 2025 Office Action issued in Japanese Patent Application No. 2022-191401.
Sep. 17, 2025 Office Action issued in Chinese Patent Application No. 202311459428.8.

* cited by examiner

*Primary Examiner* — Emmanuel M Marcelo
(74) *Attorney, Agent, or Firm* — Oliff PLC

(57) ABSTRACT

A fishing reel of the present invention comprises includes a battery box that accommodates a replaceable battery, a clutch mechanism comprising a clutch operation member that switches a spool between a free rotation state and a fishing line winding state, and a clutch position detection unit that determines whether the clutch mechanism is in an ON state or an OFF state. The clutch position detection unit comprises a magnet held by a holding member that is movable integrally with the clutch operation member, and a clutch detection sensor that detects the magnet, and the clutch detection sensor is accommodated in the battery box.

6 Claims, 9 Drawing Sheets

FISHING REEL AND BATTERY BOX

CROSS-REFERENCE TO RELATED APPLICATION

This application claims priority under 35 U.S.C. § 119 to Japanese Patent Application No. 2022-191401 filed on Nov. 30, 2022 in the Japanese Patent Office, the entire contents of each hereby incorporated by reference.

BACKGROUND OF THE INVENTION

1. Technical Field

The present invention relates to a fishing reel for winding a fishing line around a spool through a winding operation of a handle.

2. Description of the Related Art

In the related art, as a fishing reel, a double-bearing reel in which a spool is rotatably supported between side plates of a reel main body is known, and such a double-bearing reel is equipped with a counter display function of displaying a release amount (water depth) of a fishing line when a clutch mechanism is turned off and the spool is set to a free rotation state. Normally, the release amount of the fishing line is calculated according to a predetermined program by arranging a magnet on the side surface of the spool and detecting the magnet with a magnetic sensor provided on the reel main body to detect a rotation amount of the spool.

In the double-bearing reel described above, there are cases where it is desired to detect the movement of an actuating member and add a new function in addition to detecting the rotation of the spool. For example, JP 2020-103043 A discloses an electric reel in which a clutch sensor having a function of detecting a clutch-ON state and a clutch-OFF state of a clutch mechanism is provided on a clutch plate.

SUMMARY OF THE INVENTION

Since the clutch sensor disclosed in JP 2020-103043 A is provided on the clutch plate constituting the clutch mechanism disposed on the side plate on the handle side, the side plate on the handle side is enlarged, and it is difficult to downsize the reel main body. That is, since it is necessary to provide an accommodating portion for accommodating the clutch sensor and to ensure waterproofness of the housing portion, there is a limit in reducing the size of the reel main body.

Note that, among hand-wound double-bearing reels, there is a type in which a control case including a display unit is disposed between left and right side plates, and an IC counter that displays water depth information, shelf information, and the like is attached to the display unit. However, there is no technical idea of originally installing a clutch sensor in such a hand-wound double-bearing reel. That is, in the related art regarding the electric or hand-wound double-bearing reel, there is no technical idea of disposing a clutch sensor that detects the ON and OFF operation of the clutch on the side plate on the side opposite to the handle by efficiently utilizing the space without increasing the size of the reel main body.

The present invention has been made in view of the above problems, and an object of the present invention is to provide a fishing reel comprising a clutch position detection unit capable of detecting ON and OFF operation of a clutch without increasing the size of a reel main body. Another object of the present invention is to provide a battery box that achieves such an object.

In order to achieve the above object, a fishing reel according to the present invention comprises: a spool rotatably supported between left and right side plates of a reel main body; a handle that rotationally drives the spool; a battery box that is provided on a side plate on a side opposite to the handle between the left and right side plates and accommodates a replaceable battery; a clutch mechanism comprising a clutch operation member that switches the spool between a free rotation state and a fishing line winding state; and a clutch position detection unit that determines whether the clutch mechanism is in an ON state or an OFF state, in which the clutch position detection unit comprises a detection target unit held by a holding member that is integrally movable with the clutch operation member, and a clutch detection sensor that detects the detection target unit, and the clutch detection sensor is accommodated in the battery box.

In the above configuration, when the clutch operation member moves along with turning ON and OFF of the clutch mechanism, the detection target unit held by the holding member moves integrally, and the clutch detection sensor disposed in the battery box detects this movement to determine whether the clutch mechanism is in the ON state or the OFF state. The battery box is provided with a waterproof structure in advance, and since the clutch detection sensor is accommodated in the battery box, it is not necessary to separately provide a housing portion that accommodates the clutch detection sensor, and it is not necessary to provide a waterproof structure. By disposing such a battery box on the side plate on the side opposite to the handle, a space can be effectively utilized, and an increase in size of the entire reel can be avoided.

In order to achieve the above object, the present invention provides a battery box accommodating a clutch detection sensor. Such a battery box can be disposed on the side plate portion of the fishing reel, which contributes to simplifying the structure of the reel main body.

According to the present invention, it is possible to obtain a fishing reel comprising a clutch position detection unit capable of detecting an ON and OFF operation of a clutch without increasing a size of a reel main body. Further, according to the battery box of the present invention, it is possible to detect the ON and OFF operation of the clutch without increasing the size of the reel main body.

BRIEF DESCRIPTION OF THE DRAWINGS

FIGS. 4A and 4B are diagrams illustrating a configuration of a battery box portion, in which FIG. 4A is a view as viewed from a rear side, and FIG. 4B is a view as viewed from a front side;

DETAILED DESCRIPTION

Figure 1:
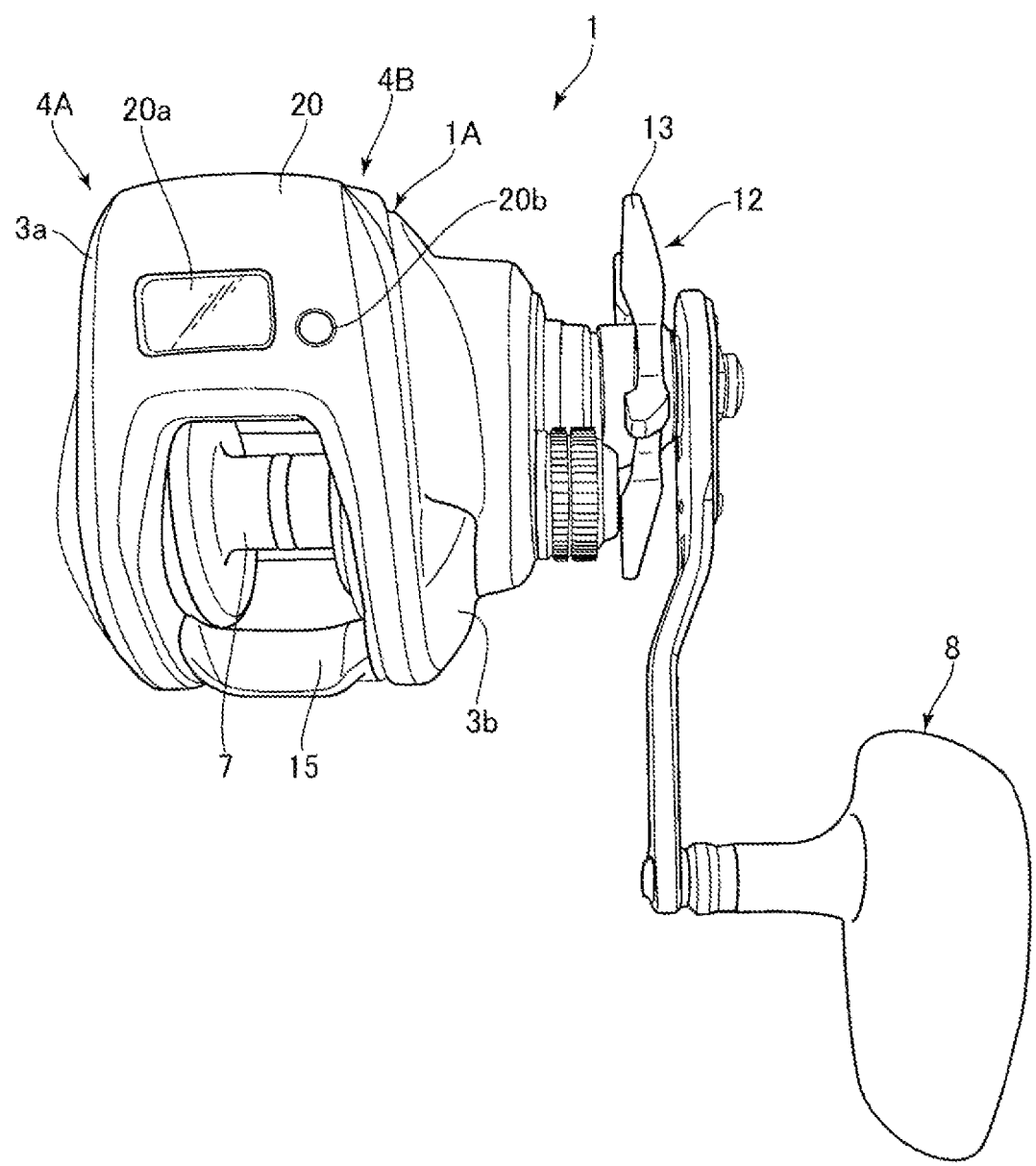
FIG. 1 is a plan view illustrating an embodiment of a fishing reel according to the present invention.
Figure 2:
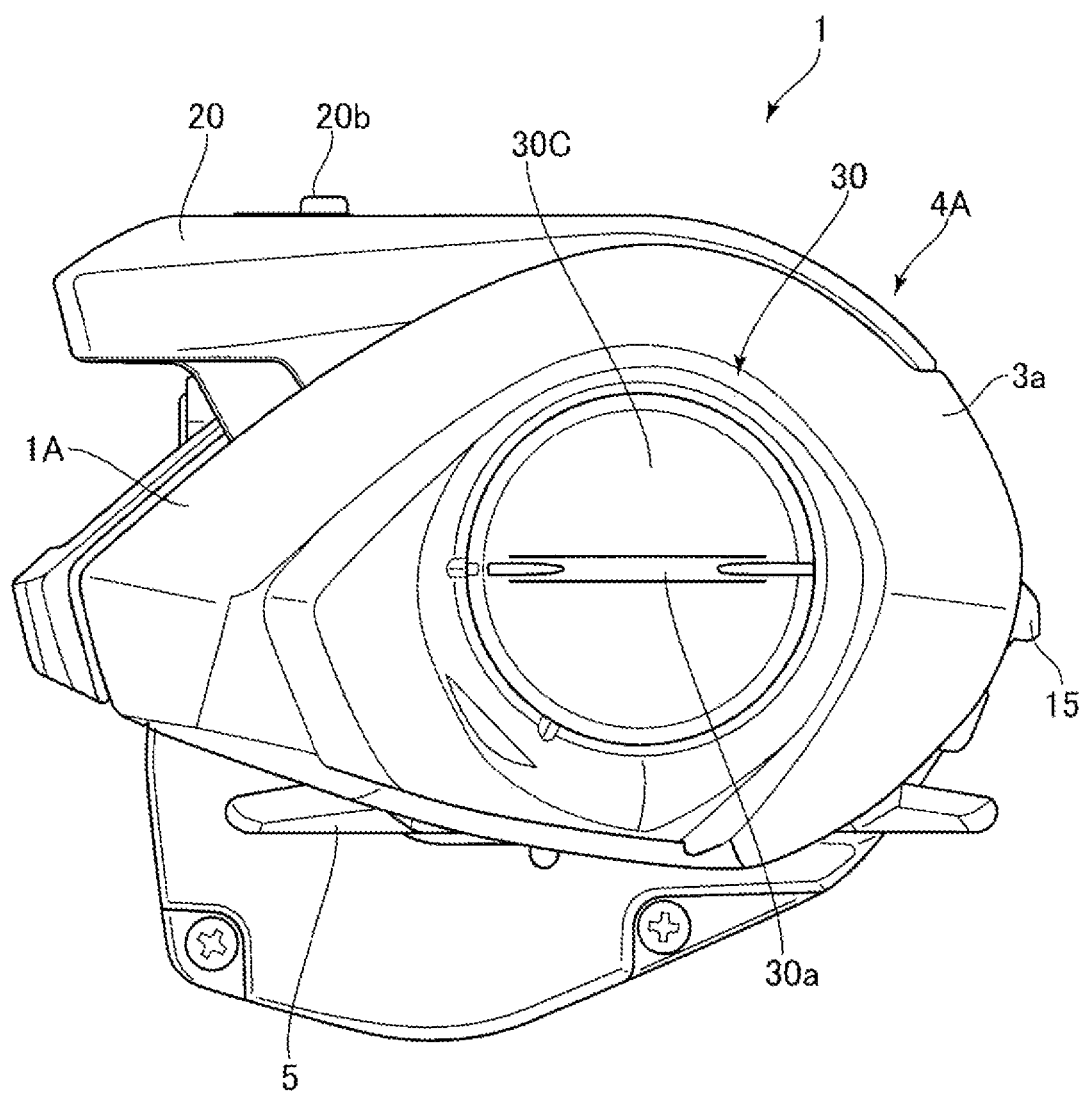
FIG. 2 is a side view viewed from a side opposite to the handle of the fishing reel illustrated in FIG. 1.

Hereinafter, an embodiment of a hand-wound double-bearing reel (hereinafter, referred to as a reel) which is a fishing reel according to the present invention will be described with reference to the drawings. FIG. 1 is a plan view illustrating an embodiment of a reel, FIG. 2 is a side view as viewed from the side opposite to the handle, and FIG. 3 is a view illustrating a state in which a cover member is removed from the state illustrated in FIG. 2.

Figure 3:
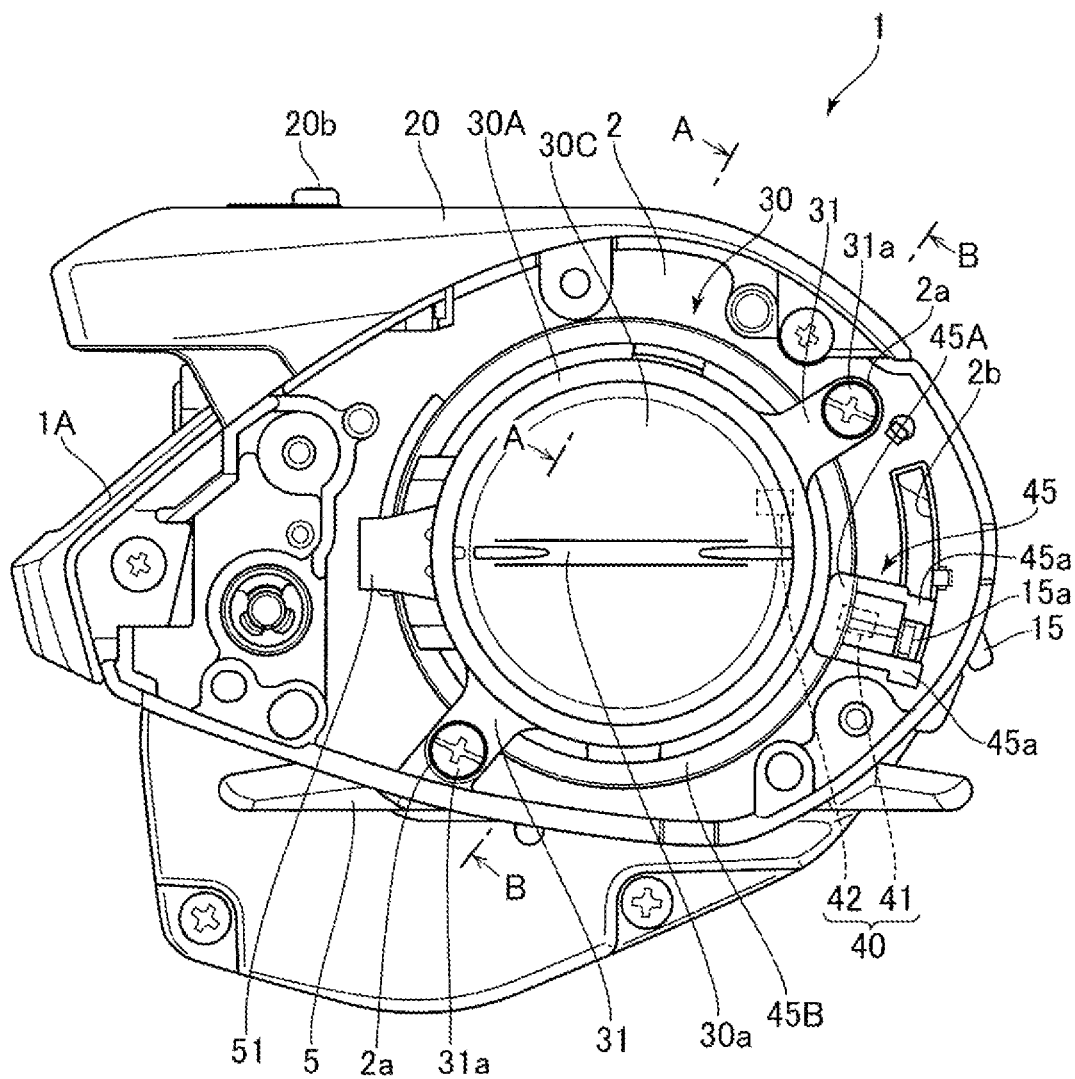
FIG. 3 is a view illustrating a state in which a cover member is removed from the state illustrated in FIG. 2.
Figure 4A:
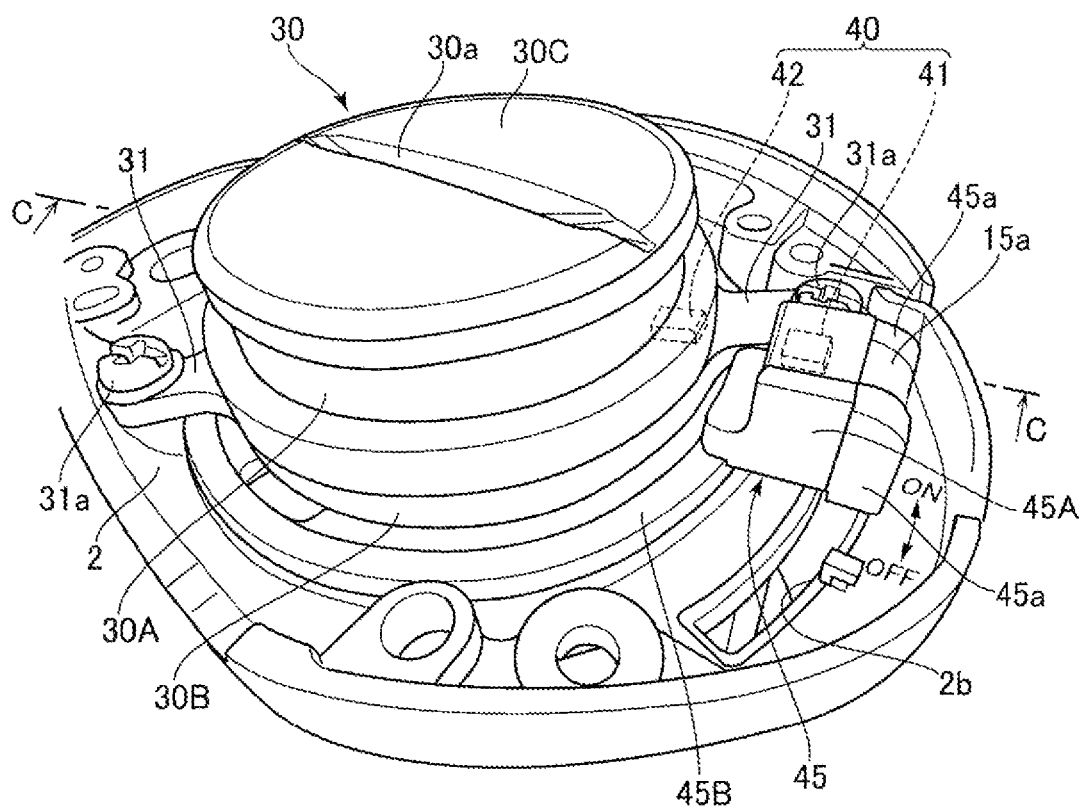
Figure 4B:
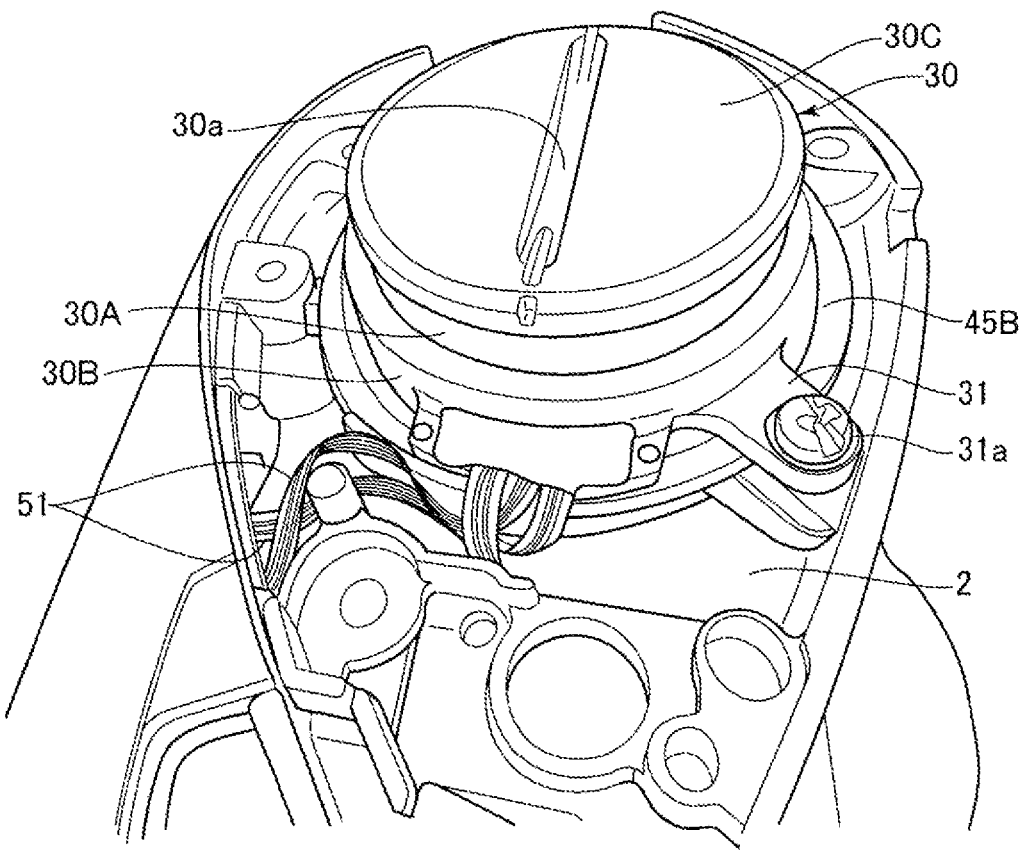
Figure 5:
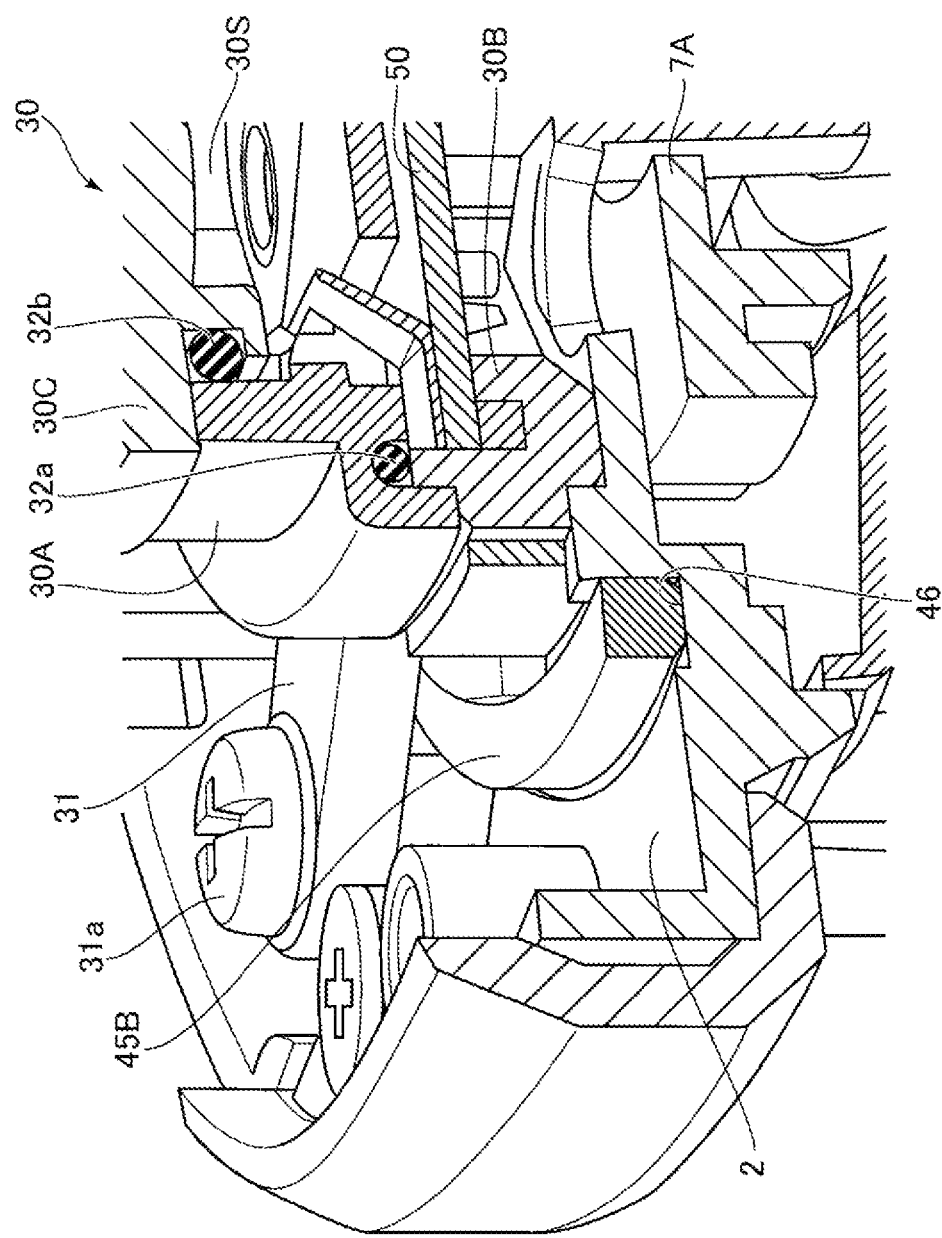
FIG. 5 is a diagram illustrating an internal structure of a battery box, and is a cross-sectional view taken along line A-A of FIG. 3.

The reel main body 1A of the reel 1 according to the present embodiment comprises left and right side plates 4A and 4B provided with left and right covers 3a and 3b attached to left and right frames (a left frame 2 is shown in FIG. 3), and the left and right frames are integrated via a plurality of supports as is known. In addition, a reel leg 5 to be attached to a reel seat of a fishing rod is integrally formed with the frame between the left and right frames.

A spool shaft is rotatably supported between left and right side plates of the reel main body 1A via a bearing, and a spool 7 around which a fishing line is wound is fixed to the spool shaft. The spool 7 is rotationally driven via a known winding drive mechanism arranged in the right side plate by rotationally operating a handle 8 provided on one side plate (the right side plate 4B in the present embodiment).

In addition, the right side plate 4B is provided with a known drag mechanism 12 that applies a drag force to the spool 7 when the fishing line is fed out from the spool 7 at the time of fishing. The drag mechanism 12 comprises a plurality of braking members frictionally engaged with a side surface of a drive gear of a winding drive mechanism rotatably mounted on a handle shaft, and a braking force adjusting body (also referred to as a star drag) 13 that applies a pressing force to the braking members. The braking force adjusting body 13 is provided on the reel main body side near the handle 8 so as to be rotatable with respect to the handle shaft, and a frictional force (drag force) of the drive gear with respect to the handle shaft can be adjusted by applying a pressing force to the braking member by rotationally operating the braking force adjusting body 13.

The winding drive mechanism comprises a drive gear rotatably attached to a handle shaft, a pinion gear meshing with the drive gear, and the like, and has a function of transmitting rotation of the handle shaft to the spool 7 via the drag mechanism 12, the drive gear, and the pinion gear. In addition, the pinion gear moves in an axial direction by the operation of a known clutch mechanism disposed in the right side plate and is disengaged from the spool shaft, whereby a power transmission state (clutch ON) and a power interruption state (clutch OFF) are switched.

The clutch mechanism comprises a clutch operation member 15 disposed between the left and right side plates 4A and 4B on a rear side of the spool 7, and when the clutch operation member 15 is pushed down, the spool 7 is brought into a clutch-OFF state where the spool 7 freely rotates forward and backward. In addition, by winding the handle 8 in the clutch-OFF state, the clutch is turned into a clutch-ON state via a known automatic return mechanism, and the fishing line can be wound around the spool 7 by winding the handle 8 while in the clutch-ON state.

Between the left and right side plates of the reel main body 1A, an information display device (an IC counter) 20 having a display unit 20a is disposed above the spool 7. The information display device 20 also has a function as a thumb rest, and the display unit 20a displays, for example, various types of information such as line length information, shelf information, time information, and the like, which detects the rotation of the spool 7 and is fed out from the spool when the clutch is turned off. Note that the information display device 20 is provided with an operation button 20b, and a user can input various types of setting information (although one operation button is provided in FIG. 1, a plurality of operation buttons may be provided).

The line length information (unreeling length, unreeling speed, and the like of fishing line) is calculated according to a predetermined calculation program based on a detection signal from a spool detection sensor configuring a spool detection unit adapted to detect a rotation amount and a rotation direction of the spool 7. On the side plate 4A on the side opposite to the handle, components of a control device that controls various types of information are disposed, such as the spool detection sensor, a control board that processes a detection signal from the spool detection sensor, a cable for transmitting and receiving a signal between the control board and the information display device 20, and a power source (battery box) for operating these components.

In the present invention, in the hand-wound double-bearing reel with the IC counter function as described above, the operation of the clutch operation member 15 of the clutch mechanism is detected and a new function is added in addition to the detection of the rotation of the spool 7. Specifically, in the present embodiment, when the spool 7 rotates in a fishing line releasing direction in a state where the drag mechanism is in operation, a function of notifying the rotation state by sound is provided. In this case, the spool 7 rotates in the fishing line releasing direction when the spool 7 rotates freely in the clutch-OFF state, or when a fish is caught in the clutch-ON state and the spool 7 rotates while the drag mechanism acts. In the present embodiment, it is detected that the clutch is in the ON state, and a notification sound is made when the spool 7 rotates in a fishing line unreeling direction in the clutch-ON state.

That is, a position of the clutch operation member 15 is detected to discriminate between the clutch-ON state and the clutch-OFF state, and when the spool 7 rotates in the fishing line releasing direction in the clutch-ON state, the rotation can be notified by sound.

The clutch position detection unit having the function as described above can be provided in association with the clutch mechanism disposed in the side plate on the handle side. However, since the winding drive mechanism, the drag mechanism, the automatic return mechanism, and the like are disposed in the side plate on the handle side as described above, if the clutch position detection unit is disposed in the side plate on the handle side, the reel main body becomes large in size. In particular, it is sometimes required to downsize the reel main body as much as possible in the hand-wound double-bearing reel as in the present embodiment and the small electric reel capable of the hand-held operation, and the clutch position detection unit is preferably configured to obtain a stable detection result efficiently and without complicating the structure.

In the present embodiment, the clutch position detection unit is efficiently disposed using the battery box 30 installed on the side plate 4A on the side opposite to the handle, and a stable detection operation can be obtained. Hereinafter, the configuration of the clutch position detection unit in the present embodiment will be described with reference to FIGS. 3 to 7.

FIG. 3 illustrates the side plate 4A on the side opposite to the handle, and illustrates a state in which the left cover 3a is removed from the state illustrated in FIG. 2. The side plate 4A is provided with a battery box 30 that supplies power to the information display device 20. The battery box 30 accommodates a battery (button battery, see FIG. 6) 80 about the size of a 500 yen coin, and comprises a substantially cylindrical first main body 30A, a second main body 30B integrated with the first main body 30A and fixed to the frame 2 of the reel main body, and a lid member 30C that closes an opening portion of the first main body 30A. A control board (circuit board) 50 is disposed in the battery box 30, has a substantially disk shape in accordance with the shape of the battery box, and has a central portion fixed to the second main body 30B by a fixing screw 50a. A cable 51 having a function of transmitting and receiving a signal to and from the information display device 20 and a function of supplying power to the information display device is connected to the control board 50.

Figure 6:
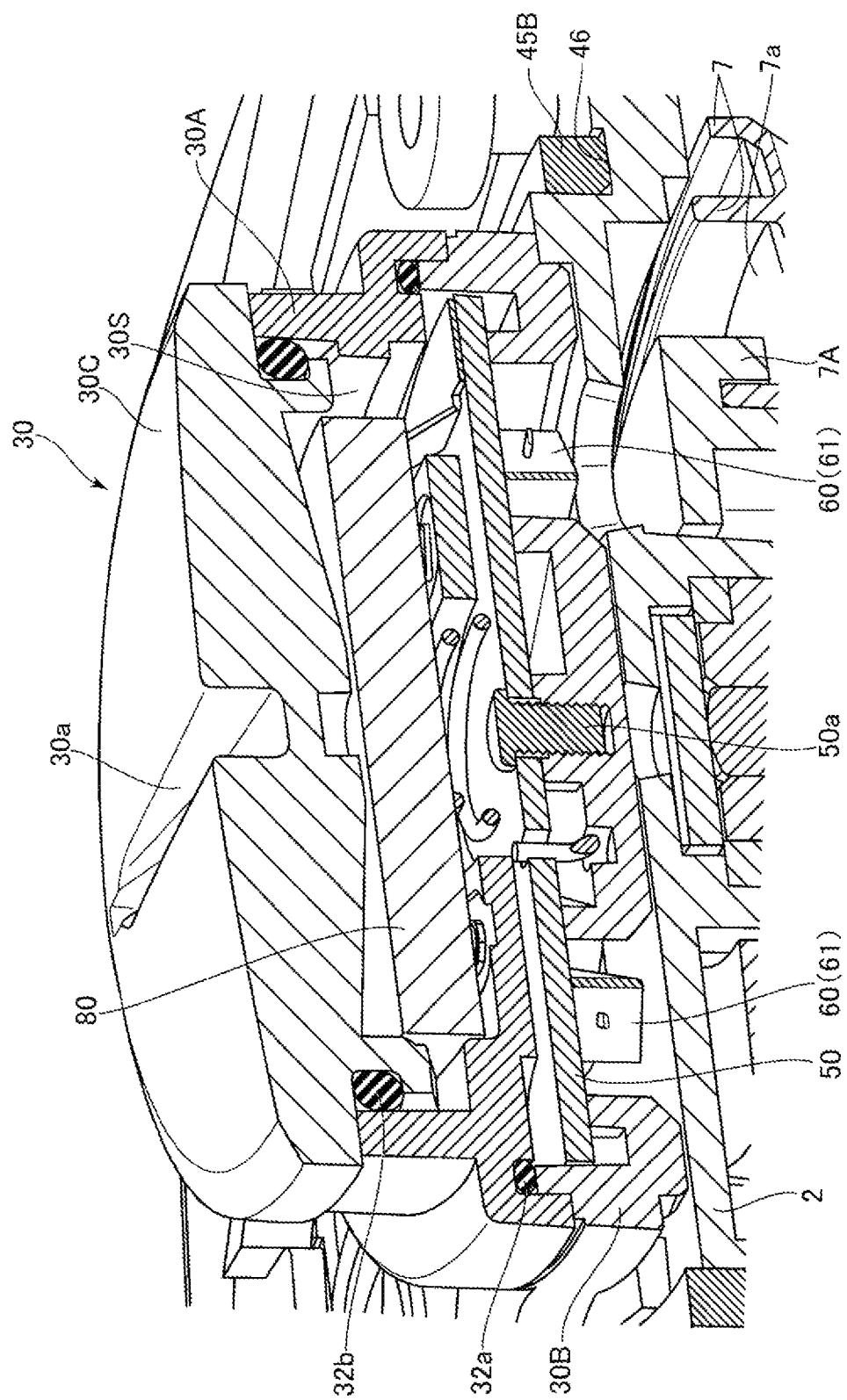
FIG. 6 is a diagram illustrating an internal structure of a battery box, and is a cross-sectional view taken along line B-B of FIG. 3.

As described above, the battery box 30 of the present embodiment has a shape having an outer peripheral surface with a substantially circular cross section, and is fixed to the frame 2 in the left side plate 4A. As illustrated in FIG. 6, in the battery box 30, O-rings (scaling members) 32a and 32b are interposed between the first main body 30A and the second main body 30B and between the first main body 30A and the lid member 30C, and the housing portion 30S in the battery box is subjected to waterproof processing.

The battery box 30 is fixed to the frame 2 by a predetermined fixing structure. In the present embodiment, a fixing piece 31 protruding in a radial direction is formed in the first main body 30A (or the second main body 30B), and is fixed to a fixing portion 2a provided in the frame 2. The battery box 30 is fixed by, for example, screwing screws 31a into the fixing portion 2a, and the fixing structure of the present embodiment is provided at two places at intervals of approximately 180° (see FIG. 3).

As illustrated in FIG. 2, the lid member 30C is substantially flush with the left cover 3a and exposed to the side surface, and a long groove 30a is formed on the surface thereof. Therefore, when the battery is exhausted, the user can insert a coin or the like into the long groove 30a, remove the lid member 30C, and replace the battery with a new battery.

The above-described battery box 30 is provided with a clutch position detection unit 40 capable of detecting ON operation and OFF operation of the clutch mechanism in association with the battery box. The clutch position detection unit 40 of the present embodiment is configured to detect the ON and OFF operation of the clutch operation member 15, and is configured to detect the OFF state when the clutch operation member 15 is pushed down from an initial position and the ON state when the clutch operation member 15 returns to the initial position. In addition, the clutch position detection unit 40 of the present embodiment comprises a detection target unit (a magnet 41) provided on the displaced side and a clutch detection sensor 42 (also referred to as a Hall element 42) provided in the battery box 30 and configured to detect a change in a magnetic field of the displaced magnet 41, and a magnetic sensor having a simple structure and capable of detecting even in a sealed state is used.

The clutch operation member 15 is disposed on the rear side of the spool 7 so as to be vertically movable between the left and right frames. FIGS. 3 to 7 illustrate the left frame 2 which is a frame on the side opposite to the handle, and an end 15a of the clutch operation member 15 is held in a long hole 2b formed in the frame 2 so as to be movable up and down. Similarly to the left frame, the other end of clutch operation member 15 is vertically movably held in a long hole formed in the right frame (not shown), whereby clutch operation member 15 is configured to stably move vertically.

The end 15a of the clutch operation member 15 is inserted into the long hole 2b, and a protruding portion from the long hole 2b is connected to the holding member 45 provided with the magnet 41. Specifically, the holding member 45 of the present exemplary embodiment comprises a holding body 45A incorporating the magnet 41, and an engaging portion 45B to be described below, and the end 15a of the clutch operation member 15 is fitted into a bifurcated projection 45a formed on the holding body 45A. Therefore, when the clutch operation member 15 is moved in a vertical direction by the ON and OFF operation of the clutch, the holding member 45 is integrally movable.

In addition, the holding member 45 is engaged with a guide portion formed around the battery box 30, and is guided so that the above-described movement of the holding member 45 is stabilized. In the present embodiment, the holding member 45 and the guide portion are in a concavo-convex engagement state, and the holding member 45 is configured to move in the concavo-convex engagement state. Specifically, the guide portion is constituted by a groove 46 formed in a circular shape (or an arc shape) along the outer peripheral surface of the battery box 30 on the exposed surface side of the frame 2, and a ring-shaped (or C-ring-shaped) guide plate (the engaging portion) 45B is integrally formed with the holding member 45 so as to be engaged (fitted) with the groove 46 (see FIGS. 4A to 7).

In the above configuration, it is preferable that the guide plate 45B is prevented from coming off in the axial direction by the fixing piece 31 provided in the battery box 30 (see FIG. 3). Further, it is preferable to provide a clearance at a connection portion between the clutch operation member 15 and the holding member 45 (the holding body 45A). For example, some degree of clearance may be provided for fitting between end 15a of clutch operation member 15 and the bifurcated projection 45a formed on holding body 45A.

The side plate 4A is provided with a spool detection unit 60 that detects a rotation speed (rotation amount) and a rotation direction of the spool 7, and the spool detection unit 60 is also disposed in association with the battery box 30. A spool detection sensor 61 constituting the spool detection unit 60 of the present embodiment uses a reed switch that opens and closes by a magnetic field change (hereinafter, also referred to as a reed switch 61), and three reed switches are arranged along a circumferential direction within the range of the side surface of the spool 7. The spool detection unit 60 comprises a detection target unit (a magnet 62) detected by the reed switch 61, and the magnet 62 is held by a magnet holding member 7A fixed to the side surface 7a of the spool 7 (the magnet 62 may be configured to be directly fixed to the side surface 7a of the spool 7).

Figure 7:
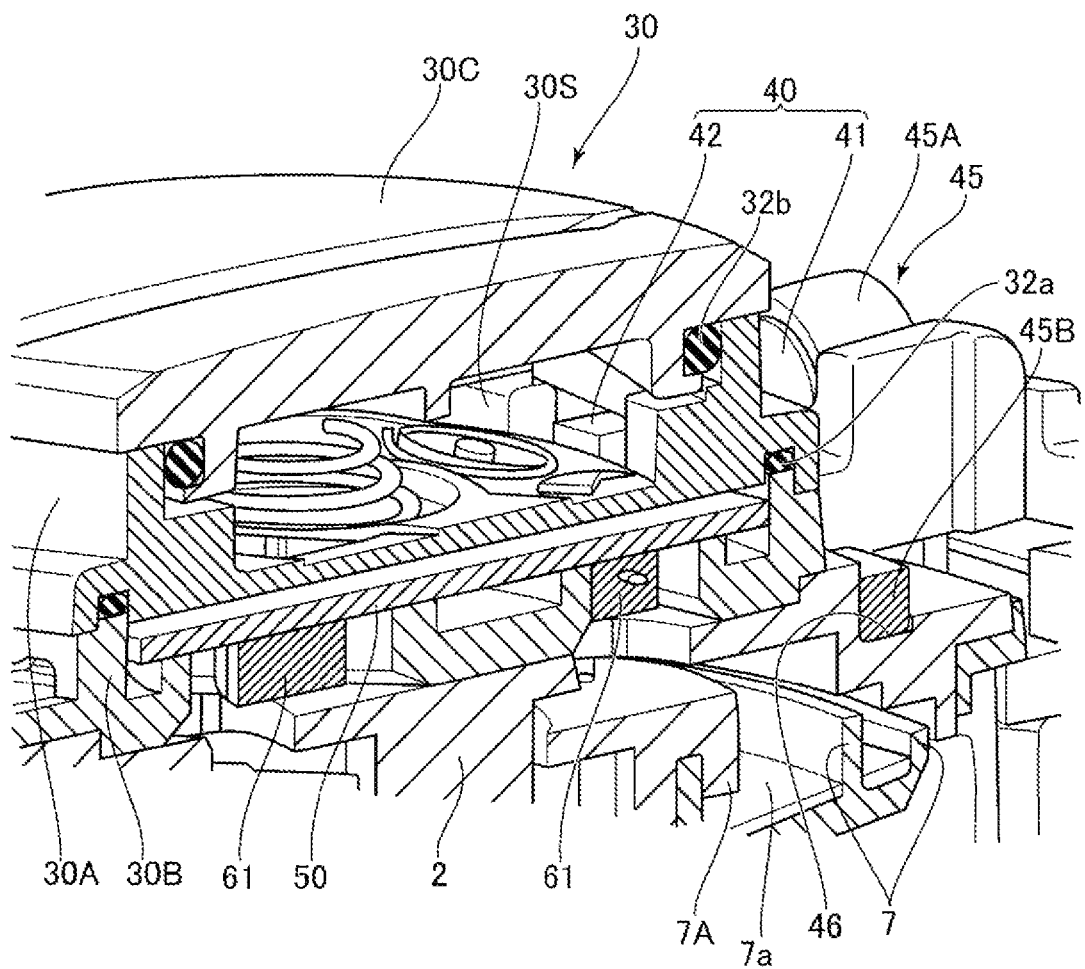
FIG. 7 is a diagram illustrating an internal structure of a battery box, and is a cross-sectional view taken along line C-C of FIG. 4A.

The reed switch 61 disposed along the circumferential direction is mounted on the back surface side (frame side) of the control board 50 fixed in the battery box 30, and the clutch detection sensor 42 as the clutch position detection unit is mounted on the front surface side (cover 3a side) of the control board 50. That is, as illustrated in FIG. 7, the clutch detection sensor (the Hall element 42) of the clutch position detection unit 40 is fixed at a predetermined position on the outer peripheral side of the first main body 30A of the battery box 30 (a position substantially opposed to the position where the clutch operation member 15 is turned on). The clutch detection sensor 42 and the spool detection sensor 61 are in a state of being attached to both surfaces of the control board 50, respectively, the control board 50 being installed in the battery box 30 that has been subjected to the waterproof processing in advance. As a result, the clutch detection sensor 42 and the spool detection sensor 61 are unitized in the battery box 30, and it is not necessary to perform waterproof processing for protecting the sensors, and the detection sensor can be simplified and made compact.

Figure 8:
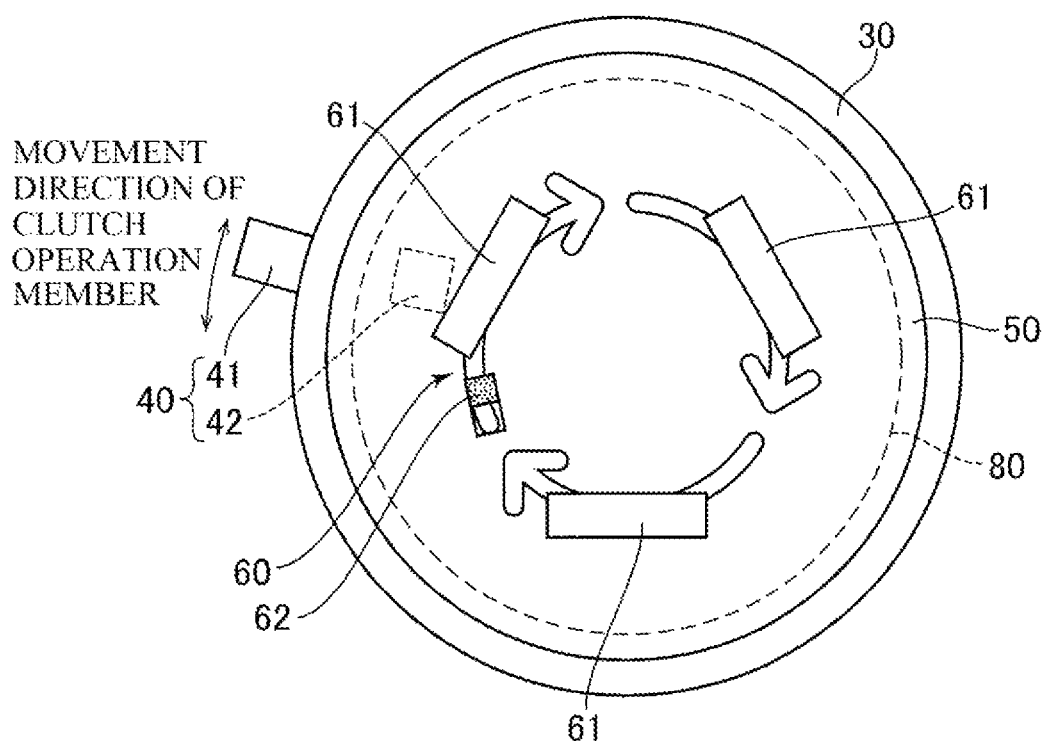
FIG. 8 is a diagram illustrating a control board installed in a battery box and a positional relationship between a clutch position detection unit and a spool detection unit, and is a schematic view as viewed from a spool side.

In this case, it is preferable that a part or all of the clutch detection sensor 42 is disposed to overlap the battery 80 accommodated in the battery box 30 when viewed from the axial direction (in FIG. 8, the entire clutch detection sensor 42 is fixed so as to overlap the battery 80). With such a configuration, it is possible to suppress an increase in size of the battery box, and it is possible to prevent an increase in size of the reel main body. In particular, the clutch detection sensor 42 entirely overlaps the battery 80, so that the size in the radial direction can be reduced.

FIG. 8 is a diagram illustrating the control board 50 installed in the battery box 30 and the positional relationship between the clutch position detection unit 40 and the spool detection unit 60, and is a schematic diagram viewed from the spool side. In the present embodiment, as described above, since both the clutch position detection unit 40 and the spool detection unit 60 are constituted by magnetic sensors that detect a change in a magnetic field, in a configuration in which these detection sensors are installed in the battery box 30, it is necessary to consider arrangement positions of the both sensors. In the present embodiment, the detection sensors (the Hall element 42 and the reed switch 61) are installed on both sides of the control board 50 hermetically accommodated in the battery box 30, respectively. Thus, space efficiency is improved when the two detection units are installed, and interference of the magnetic fields of the magnets is suppressed. In addition, since the detection sensors 42 and 61 are not installed outside the control board 50 but installed within the range of the control board and on both sides of the control board, it is possible to efficiently accommodate them in the battery box and to reduce the risk of erroneous detection due to magnetic field interference.

In this case, if the thickness of the control board 50 is large, the magnets 41 and 62 do not exert the influence of each other's magnetic fields on the other side. Therefore, the installation positions of the detection sensors 42 and 61 are not particularly limited. However, if the thickness of the control board 50 is small, the magnetic fields of the magnets 41 and 62 may interfere each other (magnetic field interference). Therefore, as illustrated in FIG. 8, it is preferable that the detection sensors 42 and 61 are disposed at positions shifted from each other without overlapping each other in the axial direction so as to maintain a certain distance (distance at which magnetic field interference does not occur) across the control board 50. Thus, the risk of erroneous detection can be reduced.

In the present embodiment, the clutch position detection unit 40 is used to emit a sound (drag sound) when the spool detection unit 60 detects the rotation in the fishing line releasing direction, for example, in a case where it is determined that the clutch mechanism is in the ON state. For example, when a fish is caught when the clutch mechanism is in the ON state, a fishing person can grasp that the drag mechanism slides and the fishing line is fed out. Note that, in the notification sound in such a state, a sound volume is changed or a sound quality is changed according to the rotation speed of the spool, so that the fishing person can grasp the braking state of the drag mechanism.

According to the fishing reel described above, the following operational effects can be obtained. Since the clutch position detection unit 40 is not installed on the side plate on the handle side but is installed on the side plate on the side opposite to the handle, it is possible to efficiently utilize the space without increasing the size of the reel main body. In particular, in a hand-wound double-bearing reel or a small electric reel capable of the hand-held operation, a new function can be installed without increasing the size of the reel main body.

In addition, since the clutch detection sensor 42 is disposed using the internal space of the battery box 30, a waterproof measure using a seal structure of the battery box 30 can be taken, and it is not necessary to separately provide a waterproof structure in the detection sensor, and the structure can be simplified and downsized. In this case, by using the magnetic sensor as the clutch detection sensor, the structure is simplified, and the internal space in the battery box 30 can be efficiently used.

When clutch operation member 15 moves in accordance with the ON and OFF operation of the clutch mechanism, magnet 41 held by holding body 45A of holding member 45 integrally moves in the vertical direction along with the movement of clutch operation member 15. The detection sensor 42 disposed in the battery box 30 detects a change in the magnetic field of the magnet 41 in the holding body 45A, detects the position of the clutch operation member 15, and determines whether the clutch mechanism is in the ON state or the OFF state. In the holding member 45, the ring-shaped guide plate 45B is engaged with the guide portion (groove 46) formed in the frame 2 along the outer peripheral surface of the main body of the battery box 30, and the guide plate 45B can stably rotate, so that the movement of the holding body 45A holding the magnet 41 is also guided in a stable state. Therefore, stable detection capability can be secured.

In particular, in the present embodiment, since the guide plate 45B of the holding member 45 rotates along the circumferential direction of the battery box, it is possible to perform setting so as to maintain the same distance with the detection sensor 42, and it is possible to exhibit stable detection capability.

Further, in the present embodiment, since the guide plate 45B is prevented from coming off in the axial direction by the fixing piece 31 provided in the battery box 30, the guide plate 45B is not displaced in the axial direction, and it is possible to exhibit stable detection capability. In addition, by providing a clearance at the coupling portion between the clutch operation member 15 and the holding member 45 (the holding body 45A), even if rattling occurs during the movement of the clutch operation member, the rattling can be absorbed, and the rotation of the guide plate 45B is not affected, and stable detection capability can be secured.

Furthermore, since the battery box 30 incorporating the clutch detection sensor 42 (and the spool detection sensor 61) as in the present embodiment is unitized by being subjected to the waterproof processing in advance, the battery box can be incorporated in various places in the side plate of the double-bearing-type reel.

Although the embodiments of the present invention have been described above, the present invention is not limited to the above-described embodiments, and various modifications can be made without departing from the spirit of the present invention. For example, in the present embodiment, the cylindrical battery box 30 is mounted, and the guide portion is formed in a circular shape or an arc shape so as to be efficiently disposed. However, in a case where the battery box has a cubic (rectangular parallelepiped) shape, the guide portion can be appropriately deformed such as extending in the vertical direction or extending in the front-rear direction according to the shape of the battery box. That is, the shape of the guide portion can be appropriately modified according to the shape of the accommodated battery and the shape of the battery box.

In addition, although the holding member (the guide plate) and the guide portion are engaged with each other in a concavo-convex manner, the guide method can be appropriately modified, for example, by forming a convex portion on the frame 2 side and forming a concave portion on the guide plate side. Furthermore, the clutch detection sensor constituting the clutch position detection unit is not limited to the magnetic sensor, and can be appropriately modified, for example, using an optical sensor.

What is claimed is:

1. A fishing reel comprising:
a spool rotatably supported between left and right side plates of a reel main body;
a handle that rotationally drives the spool;
a battery box that is provided on a side plate on a side opposite to the handle between the left and right side plates and accommodates a replaceable battery;
a clutch mechanism comprising a clutch operation member that switches the spool between a free rotation state and a fishing line winding state; and
a clutch position detection unit that determines whether the clutch mechanism is in an ON state or an OFF state,
wherein the clutch position detection unit comprises a detection target unit held by a holding member that is integrally movable with the clutch operation member, and a clutch detection sensor that detects the detection target unit, and
the clutch detection sensor is accommodated in the battery box,
wherein a part or all of the clutch detection sensor is disposed to overlap a battery accommodated in the battery box.

2. A fishing reel comprising:
a spool rotatably supported between left and right side plates of a reel main body;
a handle that rotationally drives the spool;
a battery box that is provided on a side plate on a side opposite to the handle between the left and right side plates and accommodates a replaceable battery;
a clutch mechanism comprising a clutch operation member that switches the spool between a free rotation state and a fishing line winding state; and
a clutch position detection unit that determines whether the clutch mechanism is in an ON state or an OFF state,
wherein the clutch position detection unit comprises a detection target unit held by a holding member that is integrally movable with the clutch operation member, and a clutch detection sensor that detects the detection target unit, and
the clutch detection sensor is accommodated in the battery box,
wherein a part or all of the clutch detection sensor is disposed to overlap a battery accommodated in the battery box, and
wherein a control board is disposed in the battery box, the clutch detection sensor is disposed on one surface of the control board.

3. A fishing reel comprising:
a spool rotatably supported between left and right side plates of a reel main body;
a handle that rotationally drives the spool;
a battery box that is provided on a side plate on a side opposite to the handle between the left and right side plates and accommodates a replaceable battery;
a clutch mechanism comprising a clutch operation member that switches the spool between a free rotation state and a fishing line winding state; and
a clutch position detection unit that determines whether the clutch mechanism is in an ON state or an OFF state,
wherein the clutch position detection unit comprises a detection target unit held by a holding member that is integrally movable with the clutch operation member, and a clutch detection sensor that detects the detection target unit, and
the clutch detection sensor is accommodated in the battery box,
wherein a part or all of the clutch detection sensor is disposed to overlap a battery accommodated in the battery box, and
wherein a control board is disposed in the battery box, the clutch detection sensor is disposed on one surface of the control board,
wherein a spool detection unit that detects a rotation state of the spool is disposed on the side plate on the side opposite to the handle, and a spool detection sensor constituting the spool detection unit is accommodated in the battery box.

4. A fishing reel comprising:
a spool rotatably supported between left and right side plates of a reel main body;
a handle that rotationally drives the spool;
a battery box that is provided on a side plate on a side opposite to the handle between the left and right side plates and accommodates a replaceable battery;
a clutch mechanism comprising a clutch operation member that switches the spool between a free rotation state and a fishing line winding state; and
a clutch position detection unit that determines whether the clutch mechanism is in an ON state or an OFF state,
wherein the clutch position detection unit comprises a detection target unit held by a holding member that is integrally movable with the clutch operation member, and a clutch detection sensor that detects the detection target unit, and
the clutch detection sensor is accommodated in the battery box,
wherein a part or all of the clutch detection sensor is disposed to overlap a battery accommodated in the battery box, and
wherein a control board is disposed in the battery box, the clutch detection sensor is disposed on one surface of the control board,
wherein a spool detection unit that detects a rotation state of the spool is disposed on the side plate on the side opposite to the handle, and a spool detection sensor constituting the spool detection unit is accommodated in the battery box,
wherein the spool detection sensor is disposed on the other surface of the control board.

5. A fishing reel comprising:
a spool rotatably supported between left and right side plates of a reel main body;

a handle that rotationally drives the spool;

a battery box that is provided on a side plate on a side opposite to the handle between the left and right side plates and accommodates a replaceable battery;

a clutch mechanism comprising a clutch operation member that switches the spool between a free rotation state and a fishing line winding state; and a clutch position detection unit that determines whether the clutch mechanism is in an ON state or an OFF state, wherein the clutch position detection unit comprises a detection target unit held by a holding member that is integrally movable with the clutch operation member, and a clutch detection sensor that detects the detection target unit, and the clutch detection sensor is accommodated in the battery box, wherein a part or all of the clutch detection sensor is disposed to overlap a battery accommodated in the battery box, and wherein a control board is disposed in the battery box, the clutch detection sensor is disposed on one surface of the control board, wherein a spool detection unit that detects a rotation state of the spool is disposed on the side plate on the side opposite to the handle, and a spool detection sensor constituting the spool detection unit is accommodated in the battery box, wherein the spool detection sensor is disposed on the other surface of the control board, wherein the clutch detection sensor and the spool detection sensor disposed on both sides of the control board are disposed at positions shifted from each other as viewed in an axial direction.

6. A battery box that is disposed between left and right side plates of a reel main body and accommodates a battery that supplies power to a control case comprising a display unit that displays various types of information, the battery box comprising:

a clutch detection sensor constituting a clutch position detection unit that determines whether a clutch mechanism provided on the reel main body is in an ON state or an OFF state;

a spool detection sensor constituting a spool detection unit that detects a rotational state of a spool; and a control board on which the clutch detection sensor and the spool detection sensor are mounted, wherein the clutch detection sensor and the spool detection sensor are disposed on both surfaces of the control board.

* * * * *